UNITED STATES PATENT OFFICE.

CHARLES HENRY PHILLIPS AND WALLACE MASSALES TAYLOR, OF ALPENA, MICHIGAN.

FIRE AND WATER PROOF ROOFING-PAINT.

SPECIFICATION forming part of Letters Patent No. 309,490, dated December 16, 1884.

Application filed June 2, 1884. (No specimens.)

*To all whom it may concern:*

Be it known that we, CHARLES HENRY PHILLIPS and WALLACE MASSALES TAYLOR, of Alpena, in the county of Alpena and State of Michigan, have invented a new and Improved Fire and Water Proof Roofing-Paint, of which the following is a full, clear, and exact description.

Our paint consists of the following ingredients, combined in the proportions stated, viz: tar, one barrel; hydraulic cement, ten pounds; sulphur, ten pounds; red lead, ten pounds; air-slaked lime, ten pounds; mineral paint, ten pounds; salt, ten pounds; potash, ten pounds; plaster-of-paris, ten pounds; borax, ten pounds.

In preparing our improved paint, the tar is boiled for two hours. The other ingredients are then added, and the compound is thoroughly mixed and then boiled at a temperature of two hundred and twenty degrees (220°) Fahrenheit, at which temperature it should be applied to the substance to be painted, whether that substance be wood or metal.

When the paint is applied to wood, it fills all cracks and checks, preserves the wood, checks decay, and excludes air from the wood.

When the paint is applied to tin, it sets immediately, and when hard cannot be scraped off without taking the tin with it.

The paint adheres as firmly to iron as to tin.

The paint will not crack or scale off, and heat, cold, and moisture have no effect upon it.

Having thus described our invention, what we claim as new, and desire to secure by Letters Patent, is—

The herein-described paint, consisting of tar, hydraulic cement, sulphur, red lead, air-slaked lime, mineral paint, salt, potash, plaster-of-paris, and borax in the proportions specified.

CHARLES HENRY PHILLIPS.
WALLACE MASSALES TAYLOR.

Witnesses:
HENRY WARWICK,
WILLIAM A. HENDERSON.